(12) United States Patent
Till et al.

(10) Patent No.: US 10,052,576 B2
(45) Date of Patent: Aug. 21, 2018

(54) FILTER ASSEMBLY

(71) Applicant: Pall Corporation, Port Washington, NY (US)

(72) Inventors: James G. Till, Hampshire (GB); Samuel MacGregor, Hampshire (GB); Christopher C. Gunzi, Hampshire (GB); Anthony J. Munn, Hampshire (GB)

(73) Assignee: Pall Corporation, Port Washington, NY (US)

( * ) Notice: Subject to any disclaimer, the term of this patent is extended or adjusted under 35 U.S.C. 154(b) by 188 days.

(21) Appl. No.: 14/809,443

(22) Filed: Jul. 27, 2015

(65) Prior Publication Data

US 2017/0028326 A1 Feb. 2, 2017

(51) Int. Cl.
*B01D 35/30* (2006.01)
*B01D 46/00* (2006.01)
*B01D 46/24* (2006.01)
*B01D 29/96* (2006.01)

(52) U.S. Cl.
CPC ............ *B01D 35/30* (2013.01); *B01D 29/96* (2013.01); *B01D 35/306* (2013.01); *B01D 46/0005* (2013.01); *B01D 46/2414* (2013.01); *B01D 2201/0415* (2013.01); *B01D 2201/4015* (2013.01); *B01D 2201/4084* (2013.01); *B01D 2265/022* (2013.01); *B01D 2265/025* (2013.01)

(58) Field of Classification Search
None
See application file for complete search history.

(56) References Cited

U.S. PATENT DOCUMENTS

| 3,160,000 | A | | 12/1964 | Mosher |
| 4,871,455 | A | | 10/1989 | Terhune et al. |
| 5,045,192 | A | * | 9/1991 | Terhune ............... B01D 29/15 210/232 |

(Continued)

FOREIGN PATENT DOCUMENTS

| CN | 1511061 A | 7/2004 |
| CN | 103845936 A | 6/2014 |

(Continued)

OTHER PUBLICATIONS

Japan Patent Office, Notice of Reasons for Rejection in counterpart JP Application No. P2016-119009, dated Jun. 20, 2017.

(Continued)

*Primary Examiner* — Patrick J Orme
(74) *Attorney, Agent, or Firm* — Leydig Voit & Mayer (57) ABSTRACT

Filter assemblies comprising filter cartridges having a first coupling member including at least one lug having an outer diameter, and a support comprising a second coupling member having at least one channel for receiving the lug, the channel having corresponding channel walls, a terminal section including a closed end and a horizontal axis, and an angled section having an open end, the terminal section including a lug retaining section having a cross-sectional area less than the outer diameter of the lug, methods of coupling the cartridges to the supports, and methods of using the filter assemblies, are disclosed.

20 Claims, 12 Drawing Sheets

(56) References Cited

U.S. PATENT DOCUMENTS

| | | | |
|---|---|---|---|
| 6,533,933 B1* | 3/2003 | Stankowski | B01D 29/21 |
| | | | 210/232 |
| 9,067,154 B1 | 6/2015 | Branscomb et al. | |
| 2002/0027100 A1 | 3/2002 | Gershenson | |
| 2002/0153297 A1 | 10/2002 | Bozenmayer | |
| 2006/0180539 A1 | 8/2006 | Wolf et al. | |
| 2008/0142425 A1 | 6/2008 | Hansen | |
| 2009/0321340 A1 | 12/2009 | Rampen et al. | |

FOREIGN PATENT DOCUMENTS

| | | |
|---|---|---|
| DE | 20 2014 002123 U1 | 5/2014 |
| JP | 63-065918 A | 3/1988 |
| JP | 2-66121 U | 5/1990 |

OTHER PUBLICATIONS

Intellectual Property Office of Singapore, Search Report in counterpart Singapore Application No. 10201604853W, dated Nov. 4, 2016.
European Patent Office, Extended European Search Report in counterpart European Patent Application No. 16174919.7, dated Dec. 2, 2016.
Chinese Patent Office, First Office Action in counterpart Chinese Application No. 201610505532.X, dated Mar. 21, 2018.
Zou, Jiqiang, "Plastic Products and Molding Die Design Thereof," *Tsinghua University Press*, pp. 275-277, published Feb. 28, 2005.
Japanese Patent Office, Notice of Reasons for Rejection in counterpart Japanese Application No. 2016-119009, dated Feb. 13, 2018.

* cited by examiner

FILTER ASSEMBLY

BACKGROUND OF THE INVENTION

AB style filter cartridges are usually designed for vertically mounted applications. The filter cartridges are typically cylindrical, closed at the upper end and having an axial opening at the bottom end and a tubular filter medium wall though which the liquid to filtered passes. The cartridges can be designed for "inside-out" flow or "outside-in flow."

For many filter applications, the filter cartridge, which is replaceable, is secured to a base, and assembled in a device housing having an inlet and an outlet, and a fluid is filtered by passing the fluid from the outlet, through the filter medium wall, and through the outlet. After use, the filter cartridge is disconnected from the base and replaced.

However, there is a need for improved filter cartridges and methods for securing the filter cartridges to the bases.

The present invention provides for ameliorating at least some of the disadvantages of the prior art. These and other advantages of the present invention will be apparent from the description as set forth below.

BRIEF SUMMARY OF THE INVENTION

An embodiment of the invention provides a filter assembly comprising (a) a filter cartridge comprising a closed end and an open end; a handle attached to the closed end, at least one filter module interposed between the closed end and the open end; and a first coupling member attached to the open end, the first coupling member having a central lumen therethrough and an external surface, and at least one lug extending from the exterior surface, the lug having an outer diameter; and, (b) a support comprising a second coupling member, the second coupling member having a central lumen therethrough and a side wall having at least one channel for receiving the lug, the channel having corresponding channel walls, a terminal section including a closed end and a horizontal axis, and an angled section, angled from the horizontal axis, the angled section having an open end, the terminal section including a lug retaining section having a cross-sectional area narrower than the outer diameter of the lug, the lug retaining section providing resistance as the lug passes through the narrower cross-sectional area; wherein the filter cartridge is engageable with the support by coupling the first and second coupling members together such that the lug is rotated in the channel from the angled section, through the lug retaining section, into the terminal section, the lug retaining section preventing the lug from rotating out of the terminal section. Preferably, the filter cartridge has at least two lugs extending from the exterior surface, and the side wall of the second coupling member has at least two channels, each channel for receiving a separate lug.

Embodiments of the invention also include methods for securing the filter cartridge to the support, filtering fluids using the filter assembly, and filter devices comprising the filter assemblies.

BRIEF DESCRIPTION OF THE SEVERAL VIEWS OF THE DRAWING(S)

FIG. 1A is a side view, FIG. 1B is a vertical cross-sectional view.

FIGS. 4A, 4C, and 4E show in side views, FIGS. 4A, 4C, and 4E show, respectively, a lug sliding along a channel; the lug passing through a lug retaining section of the channel; and the lug in a terminal section of the channel, wherein the lug retaining section prevents the lug from rotating out of the channel. FIGS. 4B, 4D, and 4F, show the respective positions of the first and second coupling members as the lug slides along the channel, wherein the respective positions are the same when the lug passes through the lug retaining section, and when the lug is in the terminal section of the channel.

FIG. 6A shows a perspective view.

FIG. 7A is a perspective view of a device housing.

DETAILED DESCRIPTION OF THE INVENTION

In accordance with an embodiment of the present invention, a filter assembly is provided comprising (a) a filter cartridge comprising a closed end and an open end; a handle attached to the closed end, at least one filter module interposed between the closed end and the open end; and a first coupling member attached to the open end, the first coupling member having a central lumen therethrough and an external surface, and at least one lug extending from the exterior surface, the lug having an outer diameter; and, (b) a support comprising a second coupling member, the second coupling member having a central lumen therethrough and a side wall having at least one channel for receiving the lug, the channel having corresponding channel walls, a terminal section including a closed end and a horizontal axis, and an angled section, angled from the horizontal axis, the angled section having an open end, the terminal section including a lug retaining section having a cross-sectional area narrower than the outer diameter of the lug, the lug retaining section providing resistance as the lug passes through the narrower cross-sectional area; wherein the filter cartridge is engageable with the support by coupling the first and second coupling members together such that the lug is rotated in the channel from the angled section, through the lug retaining section, into the terminal section, the lug retaining section preventing the lug from rotating out of the terminal section. Preferably, the filter cartridge has at least two lugs extending from the exterior surface, and the side wall of the second coupling member has at least two channels, each channel for receiving a separate lug.

The corresponding channel walls can comprise parallel straight walls.

Embodiments of the invention also include methods for securing the filter cartridge to the support, filtering fluids using the filter assembly, and filter devices comprising the filter assemblies.

For example, in one embodiment, a method for engaging a filter cartridge with a support is provided, the method comprising engaging (a) a filter cartridge comprising a closed end and an open end; a handle attached to the closed end, at least one filter module interposed between the closed end and the open end; and a first coupling member attached to the open end, the first coupling member having a central lumen therethrough and an external surface, and at least one lug extending from the exterior surface, the lug having an outer diameter, with (b) a support comprising a second coupling member, the second coupling member having a central lumen therethrough and a side wall having at least one channel for receiving the lug, the channel having corresponding channel walls, a terminal section including a closed end and a horizontal axis, and an angled section, angled from the horizontal axis, the angled section having an open end, the terminal section including a lug retaining section having a cross-sectional area narrower than the outer diameter of the lug, the lug retaining section providing resistance as the lug passes through the narrower cross-sectional area; the method including coupling the first and second coupling members together and rotating the lug in the channel from the angled section, through the lug retaining section, into the terminal section, the lug retaining section preventing the lug from rotating out of the terminal section.

Preferably, the method comprises engaging the filter cartridge with the support until a change in resistance is felt as the lug passes through the lug retaining section, indicating that the filter cartridge is properly engaged with the support.

A filter device according to an embodiment of the invention comprises a filter device housing comprising an inlet and an outlet and including the filter cartridge engaged with the support, arranged in the filter device housing, providing a fluid flow path between the inlet and the outlet, wherein the filter cartridge is across the fluid flow path.

Advantageously, filter cartridges can be installed and replaced with less force and/or changed out more quickly than conventional filter cartridges, in particular, because the filter cartridge can be secured to the base with little, or no, push-down force. For example, in comparison to conventional current practice, requiring an installation force of about 427 Newtons, filter cartridges in accordance with an embodiment of the invention can be installed with a force of about 314 Newtons (a 26% reduction). In another example, in comparison to conventional current practice, requiring about 9.5 minutes to change out the cartridge, filter cartridges in accordance with an embodiment of the invention can be changed out in about 3.5 minutes. An additional advantage is that the user can easily confirm that the filter cartridge is installed correctly. If desired, a single large filter cartridge can be provided to replace multiple (e.g., 6) AB style cartridges a filter housing.

Each of the components of the invention will now be described in more detail below, wherein like components have like reference numbers.

As will be described in more detail below, embodiments of the invention provide a filter assembly comprising a first cartridge secured to a support in a fluid-tight manner, wherein a first coupling member is engaged with a second coupling member by rotational movement.

Figure 1A:
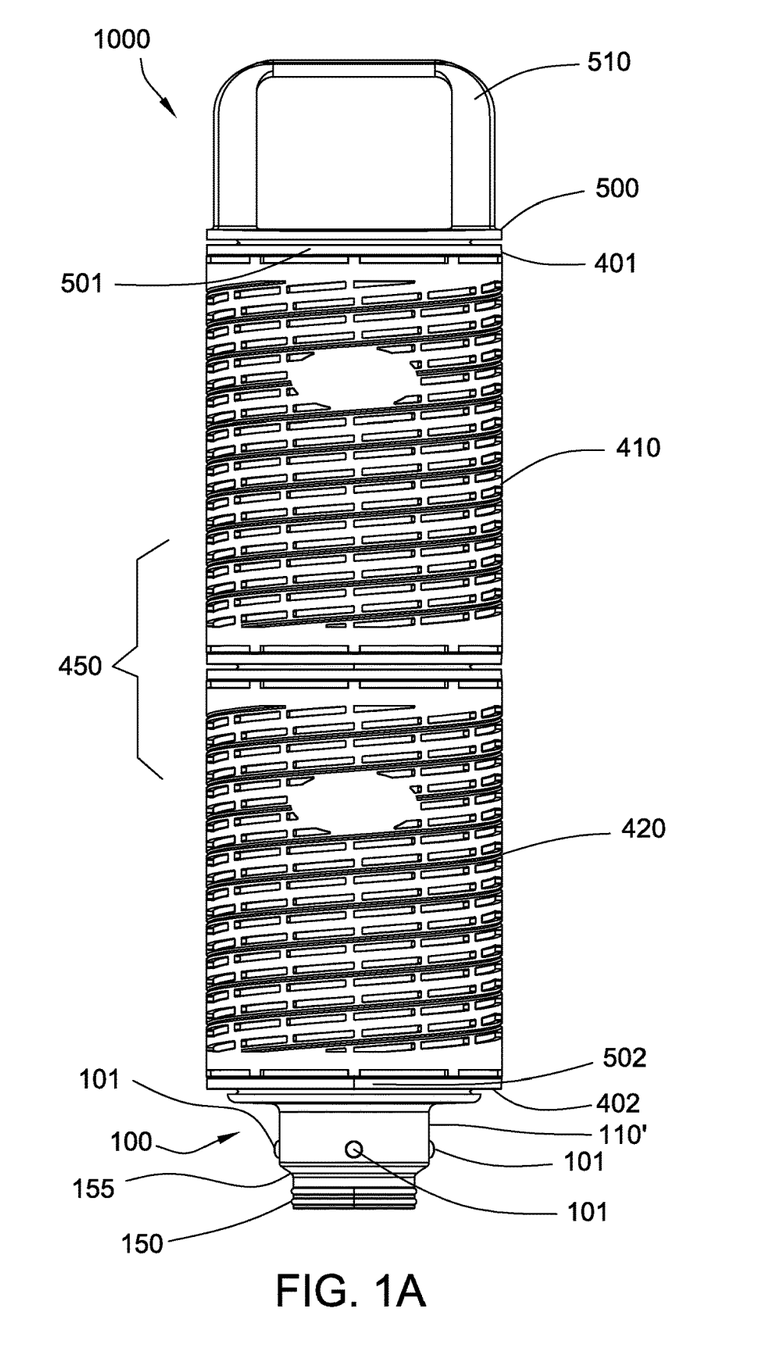
Figure 1B:
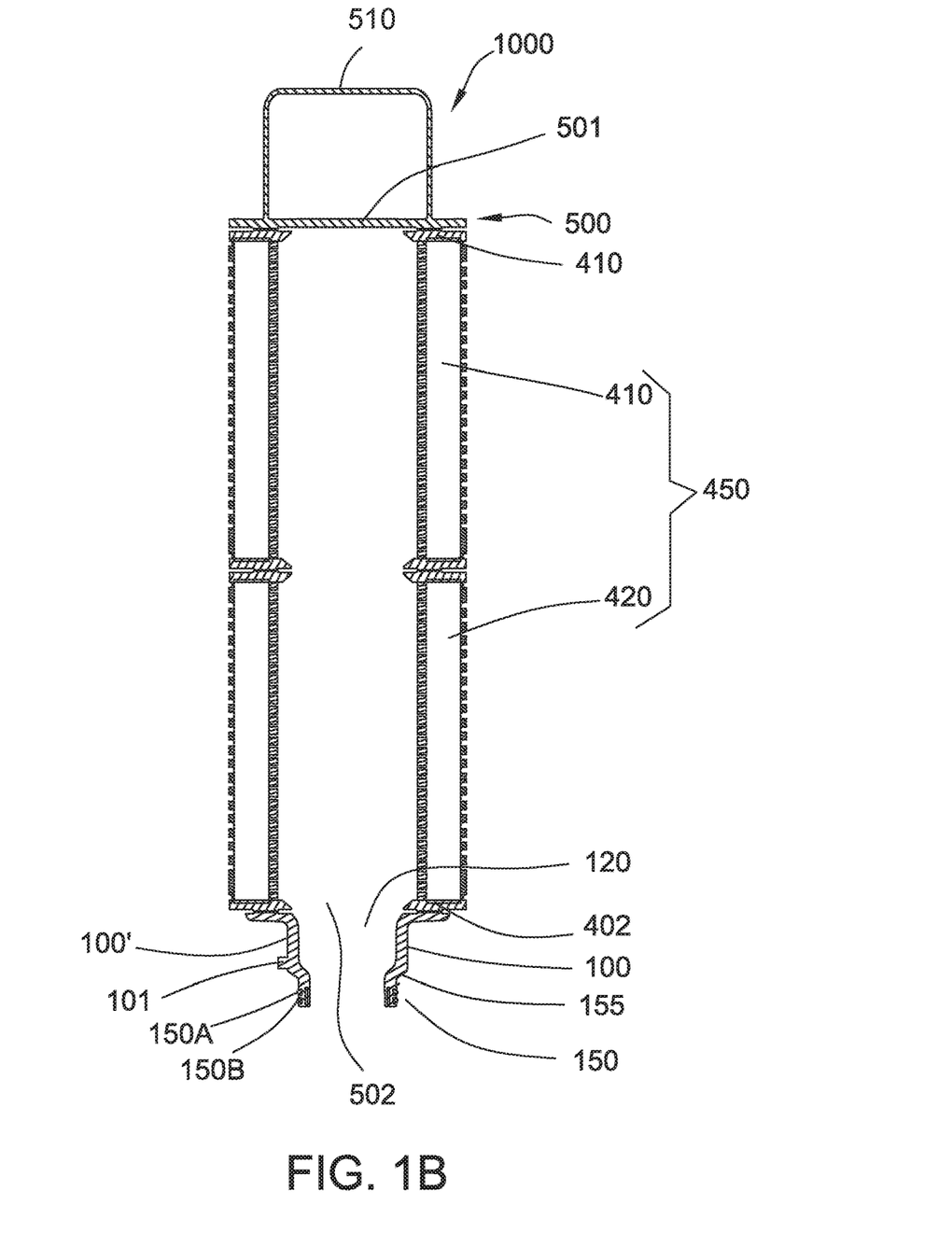
Figure 1C:
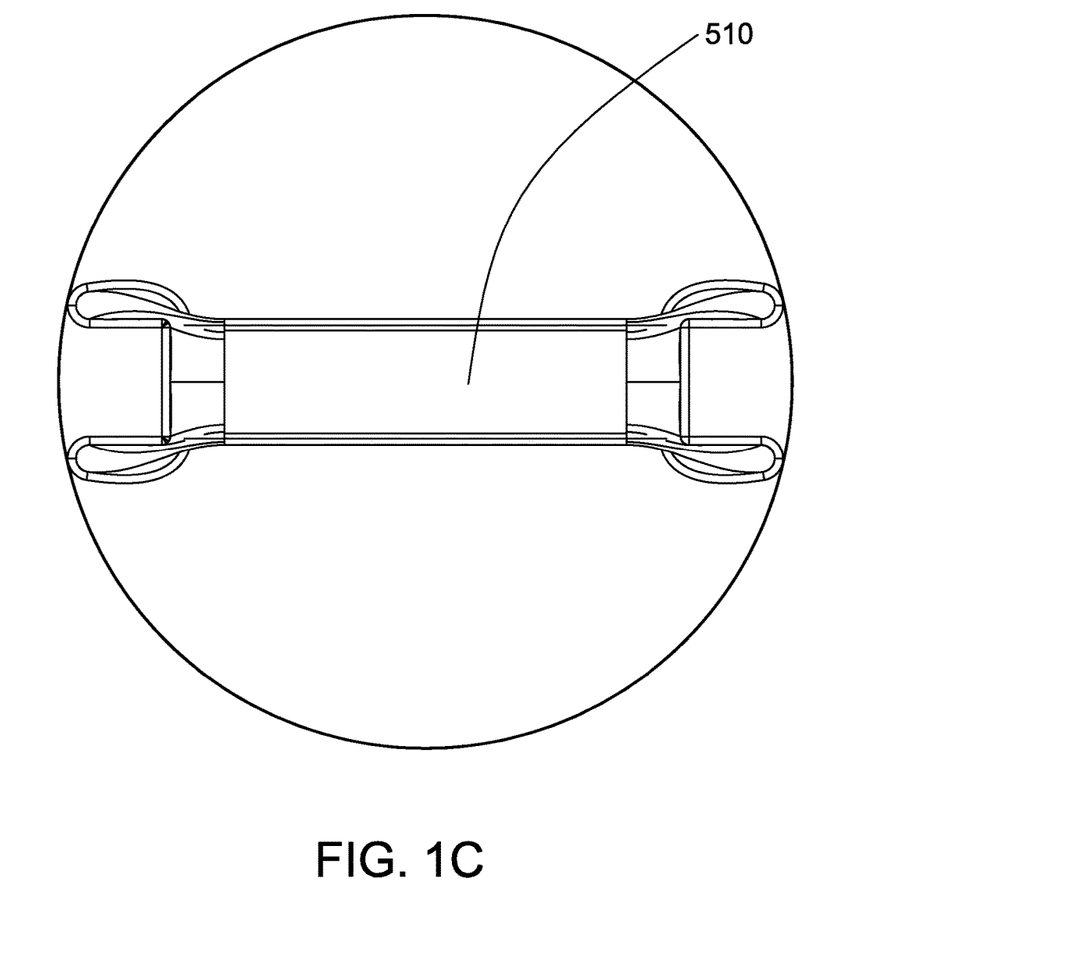
FIG. 1C is a top view, of a filter cartridge including a closed end and an open end, a handle attached to the closed end, and first coupling member attached to the open end, according to an embodiment of the present invention.

FIGS. 1A and 1B show an embodiment of a filter cartridge 1000 comprising a closed end 501 and an open end 502 and a filter module 450 interposed between the closed end and the open end. In this illustrated embodiment, the cartridge includes a housing 500 providing the closed end and the open end, and having a handle 510 (also shown in FIG. 1C) attached to the closed end, and the filter module includes a first filter 410 and a second filter 420, the filters each including end caps, wherein end cap 401 can be closed, and/or closed by housing closed end 501, and end cap 402 is open. First coupling member 100 (which preferably comprises a polymeric material, e.g., polypropylene), which has a central lumen 120 therethrough, is attached to the open end 502 (e.g., via end cap 402). The first coupling member has an external surface 110', and at least 1 lug 101 extending from the exterior surface (FIG. 1A shows 3 lugs). The lug 101 has an outer diameter (represented by "II" in FIG. 4A).

Figure 2:
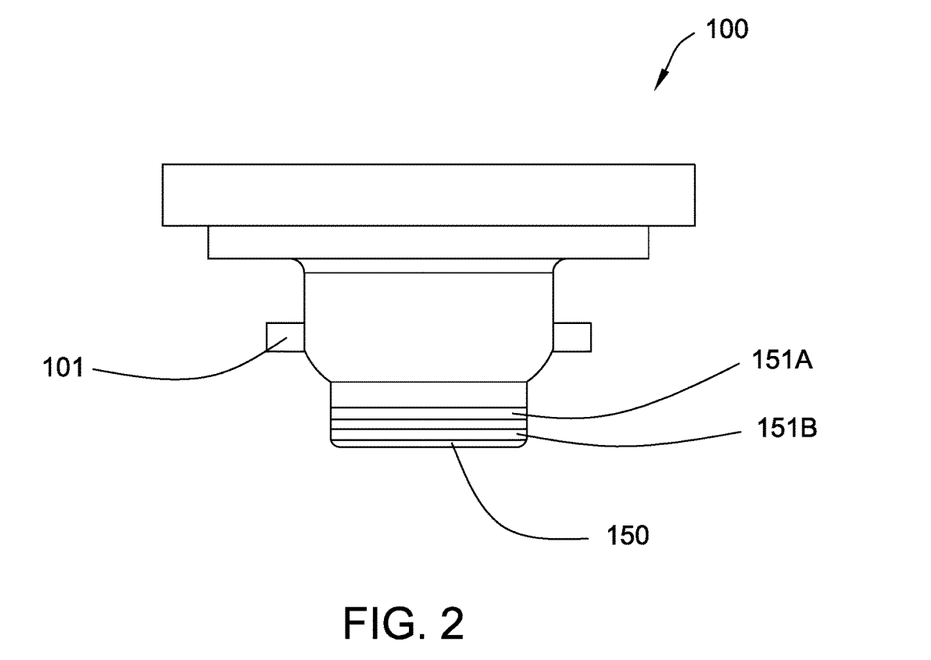
FIG. 2 is a side view of the first coupling member having first and second lugs, attached to the open end of the filter cartridge illustrated in FIGS. 1A and 1B.

The first coupling member 100 has a projection 150, including a shoulder 155, and at least one groove (FIGS. 1A and 1B show grooves 150A and 150B), wherein the groove is suitable for receiving a resilient ring. As will be discussed in more detail below, the projection can assist in providing a fluid tight seal between the first coupling member 100 and a support 275 comprising a second coupling member 200. Preferably, as shown in FIG. 2, the projection 150 has resilient rings 151A and 151B in the respective grooves 150A and 150B.

Figure 3:
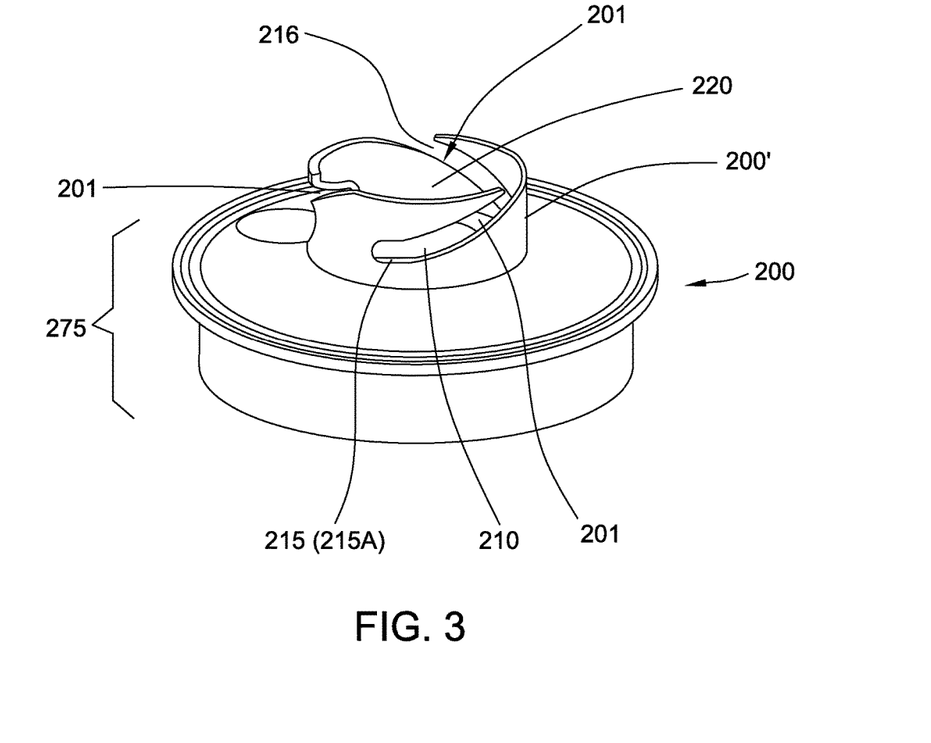
FIG. 3 is a perspective view of a support comprising a second coupling member having first and second channels for respectively receiving first and second lugs according to an embodiment of the invention.
Figure 5:
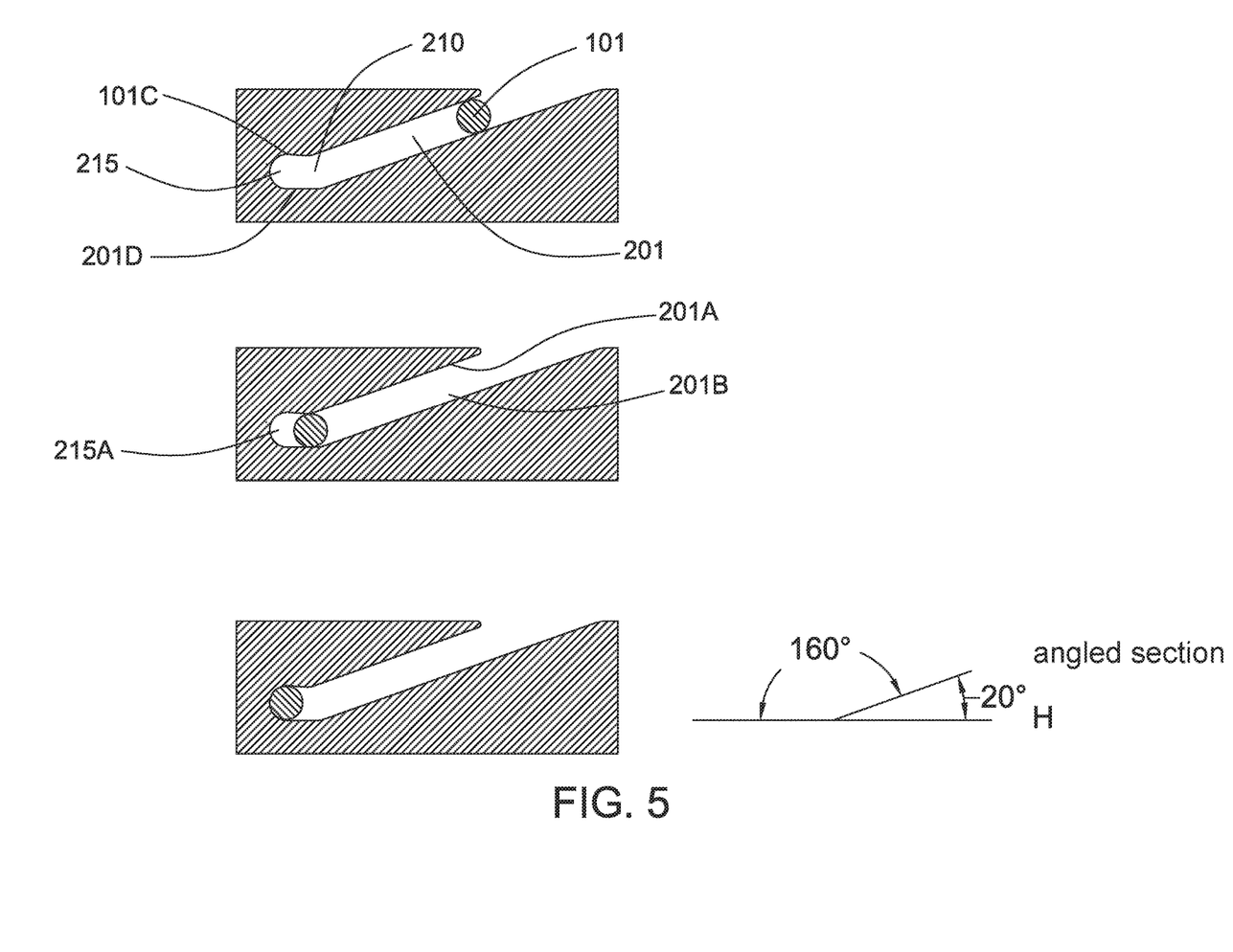
FIG. 5 shows, diagrammatically, a lug sliding along a channel, the first view showing the lug after entering the channel (shortly after the first and second coupling members are placed in contact with one another), and progressively sliding through a lug retaining section of the channel; and the lug in a terminal section of the channel
Figure 6A:
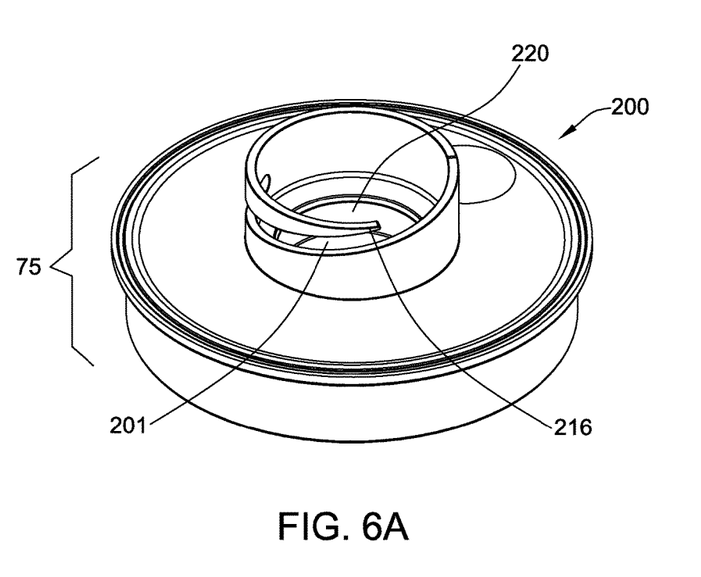
Figure 6B:
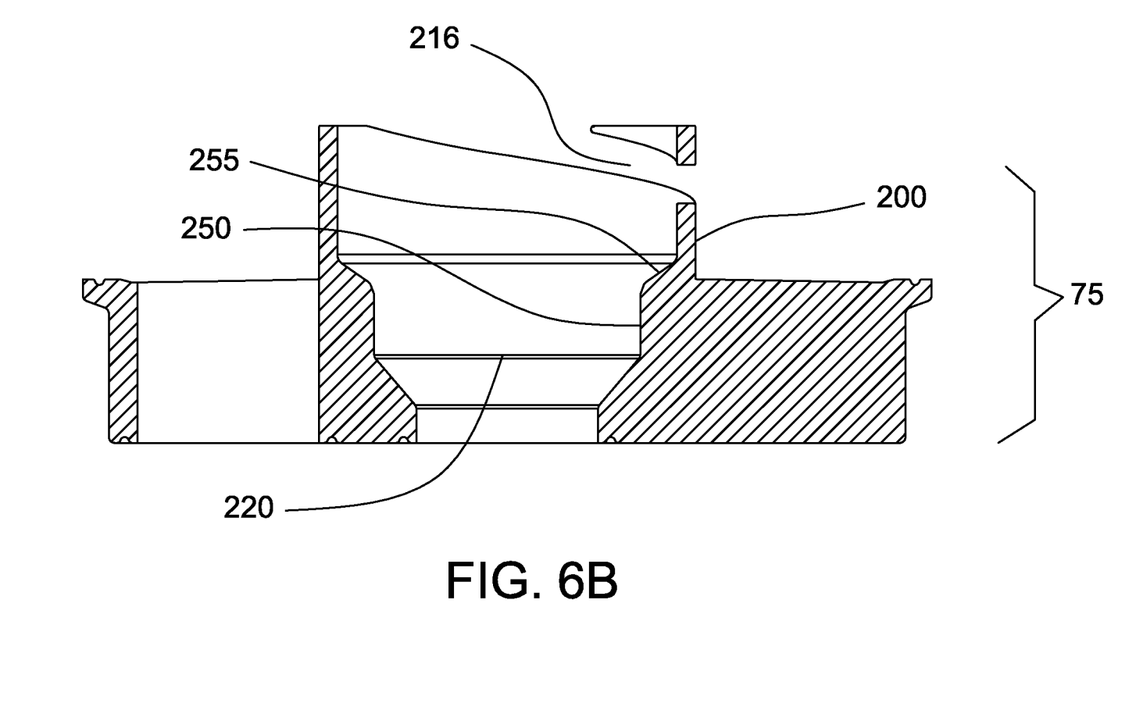
FIG. 6B shows a cross-sectional view, of a second coupling member, having a single channel, for receiving a single lug from a first coupling member having the single lug, according to another embodiment of the invention.
Figure 6C:
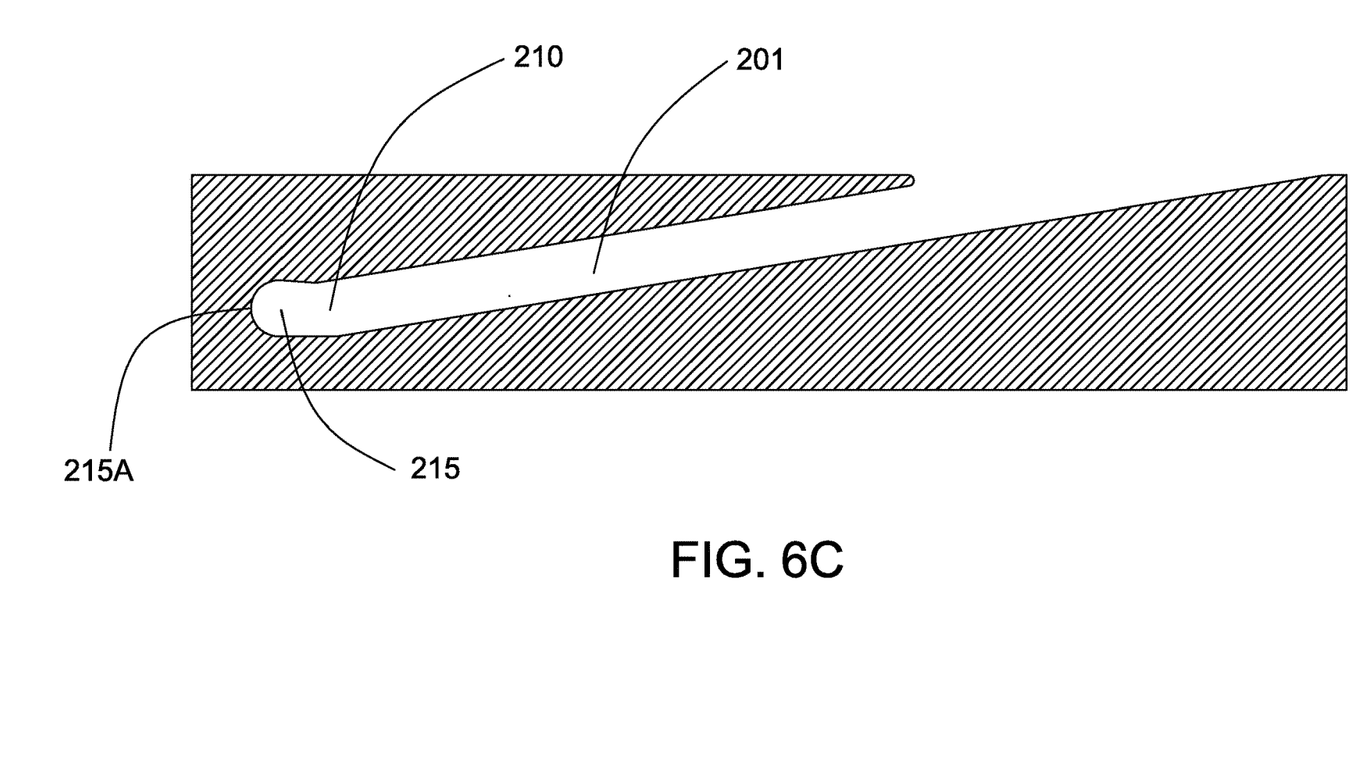
FIG. 6C shows, diagrammatically, a single channel in the second coupling member shown in FIGS. 6A and 6B.

FIG. 3 shows an embodiment of support 275 comprising second coupling member 200 (which preferably comprises a metal material, e.g., stainless steel), having a central lumen 220 therethrough, and having a side wall 200' having at least one channel 201 for receiving the lug(s) of the first coupling member (FIG. 3 shows 3 channels, and FIGS. 6A-6C show 1 channel). The illustrated channel 201 has corresponding continuous channel walls, a terminal section 215 having a closed end 215A and a horizontal axis H and an angled section, angled from the horizontal axis (shown in FIG. 5), the angled section having an open end 216. The terminal section includes a lug retaining section 210, having a cross-sectional area (the space between corresponding walls of the channel; represented by "I" in FIG. 4A) that is narrower that the outer diameter of the lug ("II" in FIG. 4A). As will be described in more detail below, as the lug 101 passes along the channel 201, the lug retaining section provides resistance as the lug passes through the lug retaining section, allowing the user to recognize that the first and second coupling members are aligned, thus indicating that the filter cartridge is properly engaged with the support. Additionally, the lug retaining section prevents the lug from rotating out of the terminal section of the channel (e.g., during reverse pressurization of the filter assembly when utilized in a device housing).

Figure 4A:
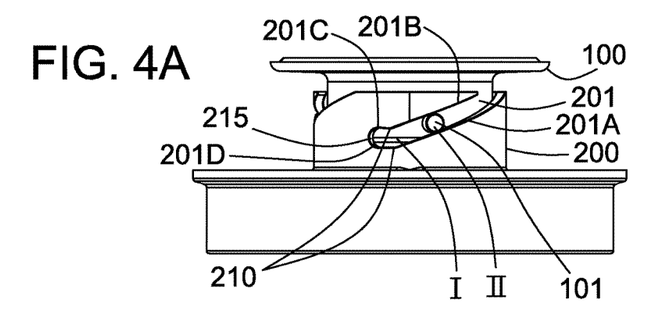
Figure 4B:
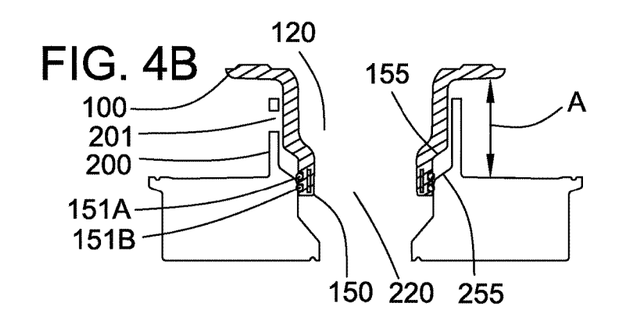
FIGS. 4B, 4D, and 4F show in cross-sectional views, coupling of the first and second coupling members together.
Figure 4C:
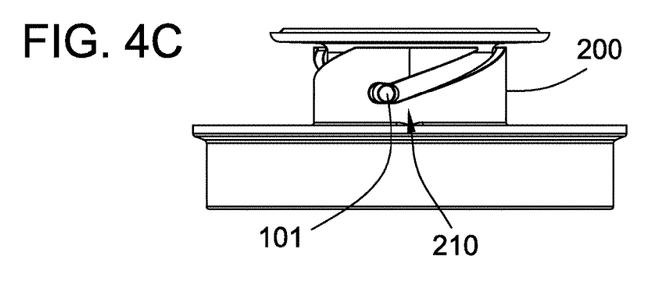
Figure 4D:
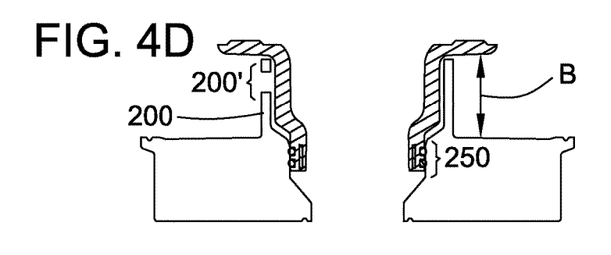
Figure 4E:
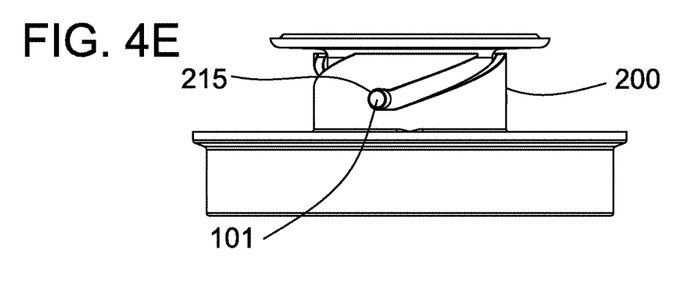

FIGS. 4A-4F show coupling of the first and second coupling members together. FIGS. 4A, 4C, and 4E show, respectively, a lug 101 sliding along a channel 201 as the first coupling member is rotationally advanced; the lug passing through a lug retaining section 210 of the channel; and the lug in a terminal section 215 of the channel, wherein the lug retaining section prevents the lug from rotating out of the channel. Since the distance "II" between corresponding walls of the channel is narrower than the outer diameter "I" of the lug, the lug is preventing from rotating out of the terminal section 215, and the operator recognizes from the change in resistance when the lug passes from the angled section of the channel to the terminal section of the channel, that the filter cartridge and support are properly aligned.

Figure 4F:
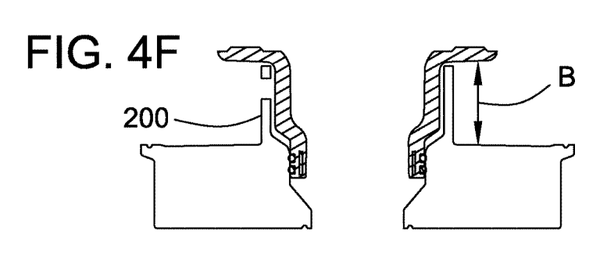

FIGS. 4B, 4D, and 4F, show the respective positions of the first and second coupling members as the lug slides along the channel, wherein the respective positions are the same when the lug passes through the lug retaining section, and when the lug is in the terminal section of the channel. Thus, FIG. 4B shows a distance "A" between the first and second coupling members, and FIGS. 4D and 4F both show the same distance "B" between the first and second coupling members, wherein distance "A" is greater than distance "B."

In the embodiments illustrated in FIGS. 4A, 4C, and 4E, the walls 201A and 201B of the angled section of the channel are parallel to each other as continuous straight walls, and the walls 201C and 201D in the terminal section are parallel to each other as continuous straight walls.

The angled section can be provided as any suitable angle. For example, as shown in FIG. 5, the angled section can be at an angle of about 20°/160° from the horizontal axis, but the invention is not so limited. Typically, the angled section is at an angle in the range of from about 20°/160° to about 40°/140° from the horizontal axis As noted earlier, the first coupling member 100 has a projection 150, including a shoulder 155, and at least one groove, wherein the groove is suitable for receiving a resilient ring, and this arrangement can assist in providing a fluid tight seal between the first coupling member 100 and a support 275 comprising a second coupling member 200. In the embodiment shown in FIGS. 4B, 4D, and 4F, the second coupling member has a shoulder 255 and a vertical wall with an internal surface providing a sealing area 250, the central lumen 220 providing a tapered cross-sectional area allowing smooth transition from the uncompressed state of the rings 151A and 151B, to a compressed state (at 250), further reducing the installation force while providing a fluid-tight seal.

After the filter cartridge is fully engaged with the support, forming a filter assembly, the filter assembly can be arranged in a filter device housing having an inlet and an outlet, providing a fluid flow path between the inlet and the outlet, wherein the filter cartridge is across the fluid flow path.

Figure 7A:
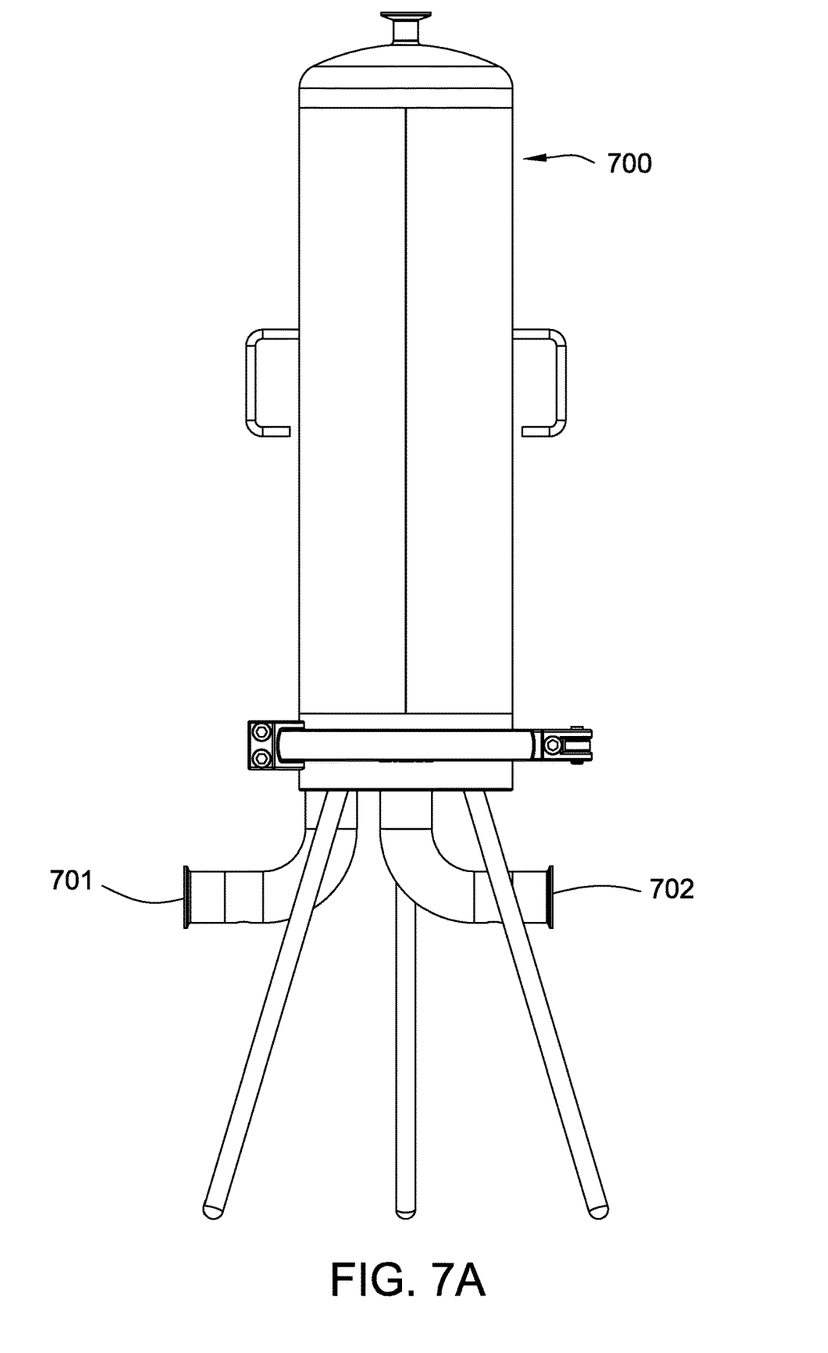
Figure 7B:
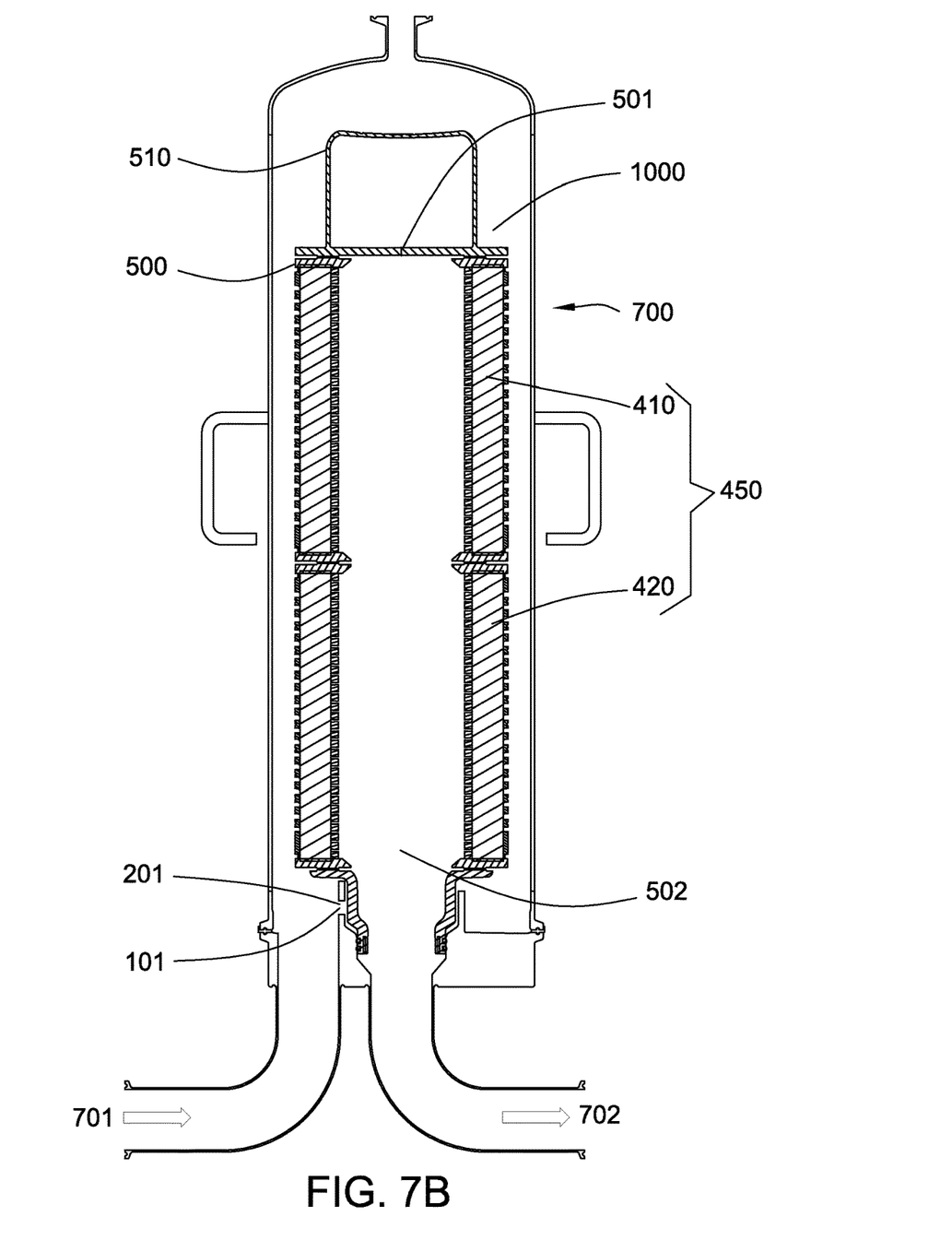
FIG. 7B is a vertical cross-sectional view of a device housing including a filter cartridge, according to an embodiment of the present invention.

FIGS. 7A and 7B show an illustrative filter device housing 700 having an inlet 701 and an outlet 702. FIG. 7B show an "outside-in" flow arrangement, but the invention is not so limited.

Embodiments of the invention include filtering fluid to remove undesirabele material such as, for example, bacteria and/or solid particles, from an aqueous fluid (e.g., water, beer, wine, or other aqueous fluids) or from an air/gas stream.

A variety of filters and filter media are suitable for use in filter cartridges and filter modules according to the invention (filter media are shown in cross-sectional view in FIG. 7B). Suitable filters include, for example, ULTIPLEAT® filters (Pall Corporation, Port Washington, N.Y.). The filter cartridge can include any number of filters and/or filter modules, e.g., arranged axially. If desired, high surface area filter modules can be utilized to replace up to 6 filters of 30" height. The filter modules can be designed such that the outer diameter is significantly reduced compared to that of 6 filter cartridges of 30" height, meaning that the filter housing is also a smaller diameter than those required for 6 filter cartridges of 30" in height and therefore reducing the foot-print of the housing.

A typical filter module includes first and second axial ends, an interior extending between the first and second axial ends, an exterior, and one or more layers of filter media between the interior and exterior. The module may also include other components, such as, e.g., an internal core, a cage located at the exterior, and end-caps at the axial ends (the embodiment illustrated in FIG. 1B shows an internal core, a cage surrounding the external surface of the filter module, and end-caps at the axial ends). The module may include pleated filter media, such as, e.g., pleated filtration membranes. Typically, the end-caps, cage, and/or core, if present, is constructed of injection molded plastic, such as polypropylene.

The module may include one or more filter layers. The filter layers may be made from one or more of a variety of materials, but are generally made from polymeric material, such as, e.g., polyethersulfone. The module may include additional elements, such as, e.g., one of more of any one of prefiltration, support, spacing, cushioning, and drainage materials. Typically, these materials are be formed from plastic, such as, e.g., polypropylene.

The filter or filter layers can have any suitable pore structure, e.g., a pore size (for example, as evidenced by bubble point, or by $K_L$ as described in, for example, U.S. Pat. No. 4,340,479, or evidenced by capillary condensation flow porometry), a pore rating, a pore diameter (e.g., when characterized using the modified OSU F2 test as described in, for example, U.S. Pat. No. 4,925,572), or removal rating that reduces or allows the passage therethrough of one or more materials of interest as the fluid is passed through the element. The pore structure used depends on the composition of the fluid to be treated, and the desired effluent level of the treated fluid.

The filter media can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Typically, the filter media has a CWST of greater than about 53 dynes/cm (about $53 \times 10^{-5}$ N/cm), more typically greater than about 75 dynes/cm (about $75 \times 10^{-5}$ N/cm) or more. The surface characteristics of the media can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface. Grafting reactions may be activated by exposure to an energy source such as gas plasma, vapor plasma, corona discharge, heat, a Van de Graff generator, ultraviolet light, electron beam, or to various other forms of radiation, or by surface etching or deposition using a plasma treatment.

Preferably, the filter cartridge is sterilizable.

The filter device housing can be fabricated from any suitable rigid impervious material which is compatible with the fluid being processed. For example, the housing can be fabricated from a metal, such as stainless steel, or from a polymer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A filter assembly comprising:
   a. a filter cartridge comprising a closed end and an open end; a handle attached to the closed end, at least one filter module interposed between the closed end and the open end; and a first coupling member attached to the open end, the first coupling member having a central lumen therethrough and an external surface, and at least one lug extending from the external surface, the lug having an outer diameter; and,
   b. a support comprising a second coupling member, the second coupling member having a central lumen therethrough and a side wall having at least one channel for receiving the lug, the channel having corresponding channel walls, a terminal section including a closed end and a horizontal axis, and an angled section, angled from the horizontal axis, the angled section having an open end and corresponding parallel channel walls extending from the open end, the terminal section including a lug retaining section having a cross-sectional area narrower than the outer diameter of the lug, the lug retaining section providing resistance as the lug passes through the narrower cross-sectional area;
   wherein the filter cartridge is engageable with the support by coupling the first and second coupling members together such that the lug is rotated in the channel from the angled section, through the lug retaining section, into the terminal section, the lug retaining section preventing the lug from rotating out of the terminal section.

2. The filter assembly of claim 1, wherein the first coupling member has at least two lugs extending from the external surface, and the side wall of the second coupling member has at least two channels, each channel receiving a separate lug.

3. The filter assembly of claim 2, wherein the central lumen of second coupling member includes a tapered cross-sectional area.

4. The filter assembly of claim 2, wherein the first coupling member comprises a cylindrical end with an exterior surface including at least one groove and at least one resilient ring in the groove, and the central lumen of the second coupling member also includes a non-tapered cross-sectional area having a vertical wall with an internal surface, wherein the resilient ring on the first coupling member is compressed when contacting the internal surface of the vertical wall, the resilient ring sealing against the internal surface when the filter cartridge is engaged with the support.

5. The filter assembly of claim 2, wherein the first and second coupling members are coupled and aligned and the filter cartridge is engaged with the support when the lug passes through the lug retaining section.

6. A filter device comprising a filter device housing comprising an inlet and an outlet and including the filter cartridge engaged with the support of claim 2 arranged in the filter device housing, providing a fluid flow path between the inlet and the outlet, wherein the filter cartridge is across the fluid flow path.

7. The filter assembly of claim 1, wherein the central lumen of second coupling member includes a tapered cross-sectional area.

8. The filter assembly of claim 7, wherein the first coupling member comprises a cylindrical end with an exterior surface including at least one groove and at least one resilient ring in the groove, and the central lumen of the second coupling member also includes a non-tapered cross-sectional area having a vertical wall with an internal surface, wherein the resilient ring on the first coupling member is compressed when contacting the internal surface of the vertical wall, the resilient ring sealing against the internal surface when the filter cartridge is engaged with the support.

9. The filter assembly of claim 7, wherein the first and second coupling members are coupled and aligned and the filter cartridge is engaged with the support when the lug passes through the lug retaining section.

10. A filter device comprising a filter device housing comprising an inlet and an outlet and including the filter cartridge engaged with the support of claim 7 arranged in the filter device housing, providing a fluid flow path between the inlet and the outlet, wherein the filter cartridge is across the fluid flow path.

11. The filter assembly of claim 1, wherein the first coupling member comprises a cylindrical end with an exterior surface including at least one groove and at least one resilient ring in the groove, and the central lumen of the second coupling member also includes a non-tapered cross-sectional area having a vertical wall with an internal surface, wherein the resilient ring on the first coupling member is compressed when contacting the internal surface of the vertical wall, the resilient ring sealing against the internal surface when the filter cartridge is engaged with the support.

12. The filter assembly of claim 11, wherein the first and second coupling members are coupled and aligned and the filter cartridge is engaged with the support when the lug passes through the lug retaining section.

13. A filter device comprising a filter device housing comprising an inlet and an outlet and including the filter cartridge engaged with the support of claim 11 arranged in the filter device housing, providing a fluid flow path between the inlet and the outlet, wherein the filter cartridge is across the fluid flow path.

14. The filter assembly of claim 1, wherein the first and second coupling members are coupled and aligned and the filter cartridge is engaged with the support when the lug passes through the lug retaining section.

15. A filter device comprising a filter device housing comprising an inlet and an outlet and including the filter cartridge engaged with the support of claim 14 arranged in the filter device housing, providing a fluid flow path between the inlet and the outlet, wherein the filter cartridge is across the fluid flow path.

16. A filter device comprising a filter device housing comprising an inlet and an outlet and including the filter cartridge engaged with the support of claim 1, arranged in the filter device housing, providing a fluid flow path between the inlet and the outlet, wherein the filter cartridge is across the fluid flow path.

17. A method for engaging a filter cartridge with a support, the method comprising:
engaging (a) a filter cartridge comprising a closed end and an open end; a handle attached to the closed end, at least one filter module interposed between the closed end and the open end; and a first coupling member attached to the open end, the first coupling member having a central lumen therethrough and an external surface, and at least one lug extending from the external surface, the lug having an outer diameter, with (b) a support comprising a second coupling member, the second coupling member having a central lumen therethrough and a side wall having at least one channel for receiving the lug, the channel having corresponding channel walls, a terminal section including a closed end and a horizontal axis, and an angled section, angled from the horizontal axis, the angled section having an open end and corresponding parallel channel walls extending from the open end, the terminal section including a lug retaining section having a cross-sectional area narrower than the outer diameter of the lug, the lug retaining section providing resistance as the lug passes through the narrower cross-sectional area;
the method including coupling the first and second coupling members together and rotating the lug in the channel from the angled section, through the lug retaining section, into the terminal section, the lug retaining section preventing the lug from rotating out of the terminal section.

18. The method of claim 17, comprising passing the lug through the lug retaining section, aligning and coupling the first and second coupling members together, and engaging the filter cartridge with the support.

19. The method of claim 18 further comprising arranging a filter assembly comprising the filter cartridge engaged with the support in a filter device housing having an inlet and an outlet, and providing a filter device providing a fluid flow path between the inlet and the outlet, wherein the filter cartridge is across the fluid flow path.

20. The method of claim 17, further comprising arranging a filter assembly comprising the filter cartridge engaged with the support in a filter device housing having an inlet and an outlet, and providing a filter device providing a fluid flow path between the inlet and the outlet, wherein the filter cartridge is across the fluid flow path.

* * * * *